Patented May 30, 1950

2,509,938

UNITED STATES PATENT OFFICE 2,509,938

PROCESS FOR PREPARING FUSED CYCLIC DERIVATIVES OF THIOPHENE

John A. Patterson, Newburgh, and Charles H. Culnane, Beacon, N. Y., assignors to The Texas Company, New York, N. Y., a corporation of Delaware No Drawing. Application May 6, 1948, Serial No. 25,536

11 Claims. (Cl. 260—329)

This invention relates to an improved process for the production of heterocyclic sulfur compounds; the invention is particularly concerned with the preparation of fused cyclic derivatives of thiophene.

Heterocyclic sulfur compounds, such as those containing a thiophene nucleus, have, in the past, been primarily of academic interest due to the uneconomical and difficult methods required for the preparation thereof. Recent developments, however, have shown that thiophene and its homologs may be synthesized by a method involving the use of economical charge stocks, which is readily adaptable to commercial operations. The present invention involves the preparation of fused cyclic derivatives wherein a thiophene nucleus is fused with more than one cyclic nucleus.

The process of the present invention broadly involves the vapor phase reaction of hydrogen sulfide with a cyclic compound having a generic formula $R_1$—$R_2$, wherein $R_1$ and $R_2$ represent cyclic nuclei in which a carbon atom adjacent to the intercyclic bond contains at least one hydrogen atom; the reaction is effected in the presence of a surface-active solid catalyst at an elevated temperature of at least 700° F. A volatile thermally labile sulfide may be used in place of or in addition to hydrogen sulfide. In the preferred aspect of the invention, cyclic compounds having the composition heretofore described, are reacted with hydrogen sulfide at an elevated temperature of between about 700 and 1400° F. in the presence of dehydrogenation type catalysts, such as silica-molybdena-alumina and silica-chromia-alumina.

The invention is particularly adaptable to the preparation of fused aryl derivatives of thiophene, such as dibenzothiophene, wherein two aryl groups are fused at the 2, 3- and 4, 5-positions respectively of the thiophene nucleus. In this preferred modification, the organic charge stock comprises aryl compounds of the generic formula $R_1$—$R_2$, wherein $R_1$ and $R_2$ represent aryl nuclei in which a carbon atom adjacent to the intercyclic bond contains at least one hydrogen atom; diphenyl, dinapthyl, phenyl naphthalene, phenyl anthracene are typical examples of aryl compounds which are a preferred charge stock in the method of this invention. The process of this invention is illustrated by the following equation wherein diphenyl is reacted with hydrogen sulfide to form dibenzothiophene:

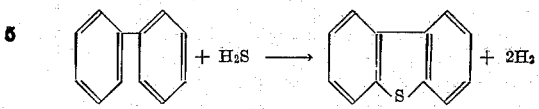

In general, any cyclic compound having the generic formula $R_1$—$R_2$ in which $R_1$ and $R_2$ represent cyclic nuclei in which a carbon atom adjacent to the intercyclic bond contains at least one hydrogen atom may be employed as the organic charge stock. An analysis of charge stock of this nature indicates that it must contain two cyclic nuclei which are joined by a bond between a carbon atom of each nucleus and there must be at least one hydrogen atom attached to carbon atoms of each nucleus adjacent to the intercyclic bond. The cyclic nuclei may be similar or dissimilar in nature. The cyclic nuclei may both be heterocyclic, aryl, hydroaromatic or naphthenic in nature or the organic charge material may comprise mixtures of heterocyclic, aryl, hydroaromatic and naphthenic nuclei which are joined together by an intercyclic bond. Thus, aryl-aryl compounds such as diphenyl, naphthenic-naphthenic compounds such as dicyclohexyl, heterocyclic-heterocyclic compounds such as dithienyl, hydroaromatic compounds such as dicyclohexenyl, aryl-naphthenic compounds such as phenylcyclohexane, aryl-heterocyclics such as phenylthiophene and heterocyclic-naphthenic compounds such as thienylcyclohexane may be employed as the charge material to the reaction of the present invention. The only requirement is that a carbon atom adjacent to the intercyclic bond of each of the cyclic nuclei contain at least one hydrogen atom.

The process of the present invention also includes the use of substituted cyclic compounds of the generic formula $R_1$—$R_2$, wherein $R_1$ and $R_2$ are cyclic nuclei containing a carbon atom adjacent to the intercyclic bond having at least one hydrogen atom. In the substituted cyclic compounds, which may be employed as the charge material, the substituents either remain attached to the hydrocarbon during the reaction or are removed during the reaction to form compounds which do not have a substantially adverse effect upon the reaction. Thus, substituents such as alkyl groups, halogen atoms and hydroxy groups may be substituted on the cyclic nuclei on either side of the intercyclic bond as long as a carbon atom of each of the cyclic nuclei adjacent to the intercyclic bond contains at least one hydrogen atom. Substituents on aryl nuclei are relatively stable and generally remain attached to the aryl nucleus during the reaction, whereas substituents attached to naphthenic nuclei are more unstable and tend to be removed from the naphthenic nucleus during the reaction. The only limitation on the nature of the charge material other than that a carbon atom of each of the cyclic nuclei adjacent to the intercyclic bond contain at least one hydrogen atom is that the charge material be vaporizable under the conditions of reaction.

As previously stated, the sulfur reactant may be either hydrogen sulfide or a volatile thermally labile sulfide. It is preferred, of course, to use hydrogen sulfide, but it may be replaced in whole or in part by other sulfides which are volatile and thermally labile under the conditions of reaction, including organic and inorganic sulfides, hydrosulfides and polysulfidies which are decomposed to hydrogen sulfide and/or sulfur, under reaction conditions. Metal sulfides are excluded from the usable inorganic sulfides since they decompose to non-volatile metallic constituents which tend to deposit on the catalytic surfaces and destroy catalyst activity. Thus, only non-metal and metalloid inorganic sulfides are included within the scope of inorganic volatile thermally labile sulfides; examples of such are ammonium sulfide, ammonium hydrosulfide and ammonium polysulfide. Usable volatile, thermally labile organic sulfides include the aliphatic mercaptans and sulfides, particularly those containing a tertiary carbon atom; ethyl mercaptan, ethyl sulfide, tertiary butyl mercaptan and tertiary butyl sulfide illustrate the organic members of this class.

The heterocyclization reaction of the invention is conducted in the presence of a solid contact catalyst which may be described chemically as a solid contact material of the class of oxides and sulfides which are stable under reaction conditions. Such catalysts include metal oxides such as molybdena, which, under the conditions of reaction, may undergo conversion to the corresponding sulfide. It is recognized that certain of the materials classified as catalysts for the subject reaction are really inert catalytically as applied to conventional hydrocarbon conversion reactants. Selection of the particular catalyst to be used depends to a large extent upon the choice of charge stock used in the reaction. The solid contact catalyst usually preferred for general application with alkylated aromatic charge stocks are the solid acid-reacting catalysts such as amphoteric metal oxides and sulfides which are stable under reaction conditions, such as silica, alumina, etc.

Specific examples of catalysts contemplated for use in the invention are oxides of aluminum, chromium, vanadium, molybdenum, titanium, magnesium, boron, silicon and sulfides of iron, nickel, cobalt, tungsten, tin, etc., as well as mixtures and chemical combinations thereof, such as silica-alumina, acid-treated bentonitic clays, etc.

The familiar class of dehydrogenation catalysts is included within the general classification of solid acid-reacting contact catalysts and are preferred catalysts for the process of this invention.

Suitable dehydrogenation catalysts are the oxides and stable sulfides of the metals of group VI of the periodic table. Specifically preferred dehydrogenation catalysts are chromia-alumina, molybdena-alumina, silica-chromia-alumina and silica-molybdena-alumina. Catalysts containing silica-stabilized alumina as a support such as chromia on silica-stabilized alumina regenerate to a high level of activity.

In carrying out the process of the invention, the reactants in vapor form are introduced into a reaction chamber containing a solid contact catalyst maintained at the desired reaction temperature. The catalytic reaction zone may be either a fixed bed type or a fluid type, in which latter type operation the catalyst is maintained in powder form in a turbulent state.

It is evident that the process may be operated in accordance with any of the usual techniques for high temperature catalytic conversions. Thus, fixed catalyst beds may be used in alternate reaction and regeneration cycles; fluid catalyst operation may be used wherein catalyst is continuously withdrawn from the catalyst zone, regenerated and reintroduced into the catalyst zone after regeneration; fluidized fixed bed operation may also be used in which the catalyst particles remain in the reaction zone during alternate reaction and regeneration cycles; stirred catalyst beds as well as moving catalyst beds of the Thermofor type are other possible alternatives.

It will be recognized that the conditions of reaction will vary in accordance with the particular reactant and catalyst employed as well as the type of process technique. As a general proposition, however, a temperature of at least 700° F., a space velocity of about 0.3 to 10, wherein space velocity defines the weights of hydrocarbon per hour per weight of catalyst and a mol ratio of $H_2S$ to thiophene derivative within the range of 0.5 to 10 are preferred in the majority of reactions.

The process of the present invention, using the prescribed catalysts and particularly dehydrogenation catalysts such as the oxides and sulfides of metals of group VI of the periodic table, is readily adaptable to commercial operation because the reaction proceeds at economically feasible space velocities. The required contact time of reactants with the catalyst is low and is of the order of 0.5 to 1.2 seconds. When employing chromia-alumina or molybdena-alumina catalysts, the heterocyclization of cyclic compounds of the general formula $R_1$—$R_2$, in which $R_1$ and $R_2$ are cyclic nuclei containing a hydrogen-substituted carbon atom adjacent to the intercyclic bond, is advantageously effected at a space velocity within the range of one to five. At such space velocities, the capacity of a commercial unit is of reasonable magnitude to support commercial development.

The particular conditions of reaction are best illustrated by reference to conditions involved in the reaction of a diaryl compound such as diphenyl with hydrogen sulfide over a pelleted silica-chromia-alumina catalyst employing a fixed bed type of process technique. In charging hydrogen sulfide and diphenyl over a chromia-alumina catalyst, the space velocity advantageously falls within the range of 0.1 to 5.0; the mol ratio of $H_2S$ to diphenyl preferably lies within the range of 2.0 to 5.0. The temperature in the catalyst zone is maintained between 750 and 1400° F. and preferably between 1050 and 1250° F. It is to be understood that the specific conditions described as optimum are those which result in optimum yields of dibenzothiophene in a single pass operation. Where a continuous recycle process is used, it may be desirable to modify these preferred conditions of reaction in order to obtain an optimum ultimate yield of the desired product.

The on-stream period for optimum production of fused cyclic thiophene derivatives will depend to some extent upon the charge stock and reaction conditions employed but will generally be about one hour. In any case, periodic determination of the yield of fused cyclic thiophene derivative will indicate the practical period of catalyst use without regeneration. When the yield of fused cyclic thiophene derivatives is found to fall off sharply, the catalyst may be regenerated by conventional methods such as regeneration with air at about 1000° F., which methods are typical of the type of catalyst technique employed.

Fused cyclic thiophene compounds produced by the reaction may be recovered from the reaction product in accordance with conventional methods of recovery. For example, the reaction product, obtained by the heterocyclization of diphenyl to dibenzothiophene, containing unreacted charge stocks, sulfur, cracked products of charge stock and unreacted hydrogen sulfide may be passed through a caustic soda solution to dissolve the acid gases. If the caustic soda solution is maintained cold, dibenzothiophene will condense as a solid which can be separated therefrom and distilled. If the caustic soda solution is maintained hot, dibenzothiophene will steam distill therefrom and can then be separated from the water layer and purified by distillation or fractional crystallization from a solvent.

The fused cyclic thiophene products of reaction may also be recovered in crude form by a simple condensation procedure using a water-cooled condensation chamber; the product is then purified by fractional distillation.

The process of the invention may be further illustrated by the following specific examples.

Example I

Diphenyl and hydrogen sulfide in the mol ratio of about 4.6 mols of hydrogen sulfide per mol of diphenyl were preheated simultaneously to approximately reaction temperature and charged to a catalytic fixed bed reaction chamber maintained at 1189° F. and atmospheric pressure. The reaction chamber contained a pelleted catalyst which consisted of a mixture of chromic oxide and silica-stabilized alumina having the approximate composition of 10 per cent $Cr_2O_3$, 5 per cent $SiO_2$ and 85 per cent $Al_2O_3$. The reactants were charged at a hydrocarbon space velocity of approximately 1.0 weights of diphenyl per hour per weight of catalyst. The catalyst was maintained on stream for a period of about 50 minutes without reactivation.

The reactor effluent was passed through steam cooled condensers into an ice-water cooled collection chamber wherein the crude dibenzothiophene and unreacted diphenyl were collected. Dibenzothiophene was purified by distillation through an electrically heated column. The yield amounted to 44.9 pounds per 100 pounds of diphenyl charged and 62.9 pounds per 100 pounds of diphenyl consumed. The dibenzothiophene boiled at about 166° C. at 10 mm. pressure and melted at 97.5–98.2° C. (lit. 99° C.) after one recrystallization from alcohol. The picrate derivative of the dibenzothiophene melted at 123.5–124.2° C. (lit. 125° C.)

Example II

Diphenyl and hydrogen sulfide in a mol ratio of about 5.2 mols of hydrogen sulfide per mol of diphenyl were preheated simultaneously to approximately reaction temperature and charged to a catalytic fixed bed reaction chamber maintained at 1168° F. and atmospheric pressure. The reaction chamber contained a pelleted catalyst which consisted of a mixture of molybdena and silica-stabilized alumina having the approximate composition of 10 per cent $MoO_3$, 5 per cent $SiO_2$ and 85 per cent $Al_2O_3$. The reactants were charged at a hydrocarbon space velocity of approximately 1.9 weights of diphenyl per hour per weight of catalyst. The catalyst was maintained on stream for a period of about 25 minutes without reactivation. The product mixture was treated in a manner similar to that described in Example I and dibenzothiophene was obtained in a yield of about 37.4 pounds per 100 pounds of diphenyl charged; the yield amounted to 44.9 pounds per 100 pounds of diphenyl consumed.

Example III

Diphenyl and hydrogen sulfide in a mol ratio of about 5.0 mols of hydrogen sulfide per mol of diphenyl were preheated simultaneously to approximately reaction temperature and charged to a catalytic fixed bed reaction chamber maintained at 1098° F. and atmospheric pressure. The reaction chamber contained a pelleted catalyst which consisted of a mixture of chromic oxide and silica-stabilized alumina having the approximate composition of 10 per cent $Cr_2O_3$, 5 per cent $SiO_2$ and 85 per cent $Al_2O_3$. The reactants were charged at a hydrocarbon space velocity of approximately 1.9 weights of diphenyl per hour per weight of catalyst. The catalyst was maintained on stream for a period of about 20 minutes without reactivation. The product mixture was treated in a manner similar to that described in Example I. The yield of dibenzothiophene amounted to 42 pounds per 100 pounds of diphenyl charged and 82 pounds per 100 pounds of diphenyl consumed.

It will be understood, of course, that these examples employ only one of the preferred charge stocks for the process of the invention and other cyclic compounds such as beta-phenyl naphthalene, dithienyl and dinaphthyl may be used as a charge stock for the process of this invention. By using selected substituted cyclic compounds of the generic formula $R_1-R_2$, wherein $R_1$ and $R_2$ represent cyclic nuclei having a hydrogen-substituted carbon atom adjacent to the intercyclic bond, fused cyclic thiophene derivatives containing substituents may be produced by the process of the present invention.

Moreover, other catalysts falling within the class previously described and other conditions of reaction may be employed.

Obviously many modifications and variations of the invention, as hereinbefore set forth, may be made without departing from the spirit and scope thereof and, therefore, only such limitations should be imposed as are indicated in the appended claims.

We claim:
1. A process for preparing fused cyclic derivatives of thiophene which comprises reacting a cyclic compound having a generic formula $R_1-R_2$, wherein $R_1$ and $R_2$ represent cyclic nuclei containing a hydrogen-substituted carbon atom adjacent to the intercyclic bond with hydrogen sulfide in the vapor phase in the presence of a solid particulate contact catalyst at an elevated temperature of at least 700° F.

2. The process according to claim 1 in which the solid contact catalyst is a dehydrogenation catalyst.

3. The method according to claim 1 in which the solid contact catalyst comprises a surface-active material and a compound selected from the class consisting of group VI metal oxides and sulfides.

4. The method according to claim 3 in which the surface-active material is silica-stabilized alumina.

5. A process for preparing fused cyclic derivatives of thiophene which comprises reacting a cyclic compound having a generic formula $R_1$—$R_2$ wherein $R_1$ and $R_2$ represent aryl nuclei containing a hydrogen-substituted carbon atom adjacent to the intercyclic bond, with hydrogen sulfide in the vapor phase in the presence of a solid particulate contact catalyst at an elevated temperature of at least 700° F.

6. The process according to claim 5 in which the solid contact catalyst is a dehydrogenation catalyst.

7. The method according to claim 5 in which the solid contact catalyst comprises a surface-active material and a compound selected from the class consisting of group VI metal oxides and sulfides.

8. The method according to claim 7 in which the surface-active material is silica-stabilized alumina.

9. A process for the production of dibenzothiophene which comprises reacting diphenyl with hydrogen sulfide in the presence of a solid contact catalyst at an elevated temperature of at least 700° F.

10. The method according to claim 9 in which solid contact catalyst comprises a surface-active material and a compound selected from the class consisting of group VI metal oxides and sulfides.

11. The method according to claim 10 in which the surface-active material comprises silica-stabilized alumina.

JOHN A. PATTERSON.
CHARLES H. CULNANE.

REFERENCES CITED

The following references are of record in the file of this patent:

UNITED STATES PATENTS

| Number | Name | Date |
|---|---|---|
| 1,421,743 | Stuer | July 4, 1922 |
| 1,907,274 | Wheeler | May 2, 1933 |

FOREIGN PATENTS

| Number | Country | Date |
|---|---|---|
| 579,917 | Germany | July 3, 1933 |